United States Patent [19]

Maher

[11] Patent Number: 5,010,443

[45] Date of Patent: Apr. 23, 1991

[54] CAPACITOR WITH FINE GRAINED BaTiO₃ BODY AND METHOD FOR MAKING

[75] Inventor: Galeb H. Maher, North Adams, Mass.

[73] Assignee: MRA Laboratories, Inc., North Adams, Mass.

[21] Appl. No.: 463,705

[22] Filed: Jan. 11, 1990

[51] Int. Cl.⁵ ............... H01G 4/12; H01G 7/00; C04B 35/46

[52] U.S. Cl. ............... 361/321; 264/61; 501/136; 252/62.3 BT; 29/25.42

[58] Field of Search ............... 501/134–139; 252/62.2, 62.3 BT; 428/138; 264/61; 361/320, 321; 427/79; 29/25.42

[56] References Cited

U.S. PATENT DOCUMENTS

| | | | |
|---|---|---|---|
| 3,977,887 | 8/1976 | McIntosh | 501/137 X |
| 4,283,753 | 8/1981 | Burn | 361/321 |
| 4,610,971 | 9/1986 | Wada et al. | 501/137 |
| 4,643,984 | 2/1987 | Abe et al. | 501/134 |
| 4,706,163 | 11/1987 | Maher | 361/321 |
| 4,799,127 | 1/1989 | Ono et al. | 264/61 X |

OTHER PUBLICATIONS

D. Hennings, "Barium Titanate Based Ceramic Materials for Dielectric Use", *Int. J. High Technology Ceramics* 3(1987), pp. 91–111.

D. Hennings et al., "Temperature Stable Dielectrics Based on Chemically Inhomogeneous BaTiO₃", *Journal American Ceramic Society*, Apr. 1984, pp. 249–254.

Primary Examiner—Donald A. Griffin

[57] ABSTRACT

Disc and multilayer ceramic capacitors having a fine grained barium titanate body having been sintered at less than 1100° C. exhibit a high dielectric constant and a smooth (X7R) temperature coefficient of capacitance. Such capacitors are made by mixing barium titanate powder of less than 0.6 micron average particle size, with around 2 weight percent of a silicate flux serving as a reactivity and sintering promoter and one weight percent Nb₂O₅ serving as a reactivity and sintering inhibitor. After preparing a green body of this mixture, the body is sintered at about 1100° C. In the case of making a multilayer monolithic capacitor, the buried electrodes contain no more than 30 weight percent palladium, and adjacent pairs of the buried electrodes have been spaced apart as close as 5 microns in capacitors of this fine grained high dielectric constant X7R ceramic leading to very high packing density.

15 Claims, 1 Drawing Sheet

CAPACITOR WITH FINE GRAINED BATIO₃ BODY AND METHOD FOR MAKING

BACKGROUND OF THE INVENTION

This invention relates to a low-temperature sintered dielectric ceramic body compound of fine barium titanate grains and a tiny amount of cadmium silicate flux, the ceramic body having a high dielectric constant and a smooth temperature coefficient of dielectric constant, especially suitable for use in high quality multilayer ceramic capacitors.

Multilayer ceramic capacitors having a smooth X7R dielectric temperature coefficient comprise a substantial portion of the large ceramic capacitor market. Progress toward better X7R ceramic bodies having higher dielectric constants (K) has been slow. It is a well known contrariness rule that whatever is done to increase the dielectric constant, also degrades the smoothness of the dielectric temperature coefficient. However, a most striking advance that violates that rule has resulted from the discovery that capacitors with ceramic bodies of very fine grains, especially around 0.8 micron diameter, tend to have both a higher dielectric constant (K) and at the same time smoother temperature coefficient of capacitance (TCC) compared to large grained (above 1 micron) ceramic bodies of the same composition.

In multilayer capacitors, the fine grain structure has the further advantage that the space between adjacent layers of buried electrodes may be commensurately smaller leading to higher capacitance per unit volume, or lower cost per microfarad. Fine-grained bodies are made by sintering very fine particle (e.g. 0.2 micron) powders having a high surface energy and advantageously sinter at a lower temperature. But for such fine-grained bodies the same old contrariness rule applies. For example, fine-grained bodies of pure barium titanate hot pressed and sintered have a K of about 3700 and are far from meeting the X7R specification. To meet this X7R standard the K over the operating temperature range of from $-55°$ C. to $+125°$ C. varies no more than 15% relative to the K at room temperature. But, when sintered with 11 wt% of a sintering flux ($CdBi_2Nb_2O_9$) at 1130° C., the ceramic is densified and easily meets the X7R standard but has a room temperature K of only 1500. Alternatively, the addition of 15 wt% of a bismuth titanate flux ($Bi_4Ti_3O_{12}$) and sintering at 1110° C. to achieve full densification yields a K of 500 at room temperature and meets the X7R standard. Using 2¼ wt% of an additive composed of $NbO_{2.5} \cdot CoO$ with the pure fine grained barium titanate provided an X7R ceramic body with a K of 3000 but required a sintering temperature of 1300° C. These results are reported by Henning et al in the paper entitled *Temperature-Stable Dielectrics Based on Chemically Inhomogeneous BaTiO₃*, Journal of the American Ceramics Society, Vol. 67, No. 4, 1984, pages 249-254.

Another well known contrariness rule, exemplified by these examples, is that the addition of a sintering flux to the ceramic start mixture reduces the sintering temperature necessary to achieve densification, and thereby reduces the amount of precious metals needed to prevent the buried electrodes from melting during sintering. The addition of flux also tends to make the temperature coefficient smoother. However, such additions of flux tend to drastically reduce the dielectric constant of the sintered ceramic. This rule applies without exception to all dielectric ceramic materials regardless of ceramic grain size.

A third contrariness rule is that the addition of a sintering aid or flux, which leads to liquid phase sintering whereby the flux melts at sintering providing a medium in which the process of simultaneous dissolution and recrystallization of the ceramic ensues, promotes grain growth. In fact this rule was not at all contrary before only a few years ago when large grains were a goal toward achieving high dielectric constant ceramics. For example, see U.S. Pat, No. 4,266,265 May 5, 1981; U.S. Pat. No. 4,120,677 Oct. 17, 1978: U.S. Pat. No. 4,066,426 Jan. 3, 1978; and U.S. Pat. No. 3,885,941 May 27, 1975. In the U.S. Pat. No. 3,231,799 Jan. 25, 1966 there is disclosed the use of separate compounds of niobium and tantalum in the start materials to provide a high K body with a smooth temperature of coefficient of capacitance (TCC). These and other elements have been recognized as grain growth inhibitors, e.g. as in the above-noted U.S. Pat. No. 4,120,677 Oct. 17, 1978 and in the pending patent application Ser. No. 06/885,509 filed July 4, 1986. The above-mentioned patents with issue dates in parentheses and the patent application are assigned to the same assignee as is the present invention.

Mechanical comminution of ceramic powder particles to reduce particle size becomes ineffective at lower than about 1 micron and particle shapes are jagged and non-spherical. Only recently have methods for making finer powder become known. For example see U.S. Pat. No. 4,654,075 Mar. 31, 1987. Such "manufactured" fine particles are advantageously spherical, have a relatively narrow particle size distribution and have an average particle size that may be varied upward from 0.1 micron in the process of manufacture. Such particles have a very high energy density and therefore will sinter at a lower temperature than larger particles of the same composition. They also are more reactive at sintering with other compounds in a ceramic start material.

It is an object of this invention to provide a dielectric ceramic body having grains of average size less than 0.9 micron and having a high dielectric constant and a smooth X7R temperature coefficient of dielectric constant.

It is a further object of this invention to provide a method for making such a dielectric ceramic body wherein the body is sintered at a temperature of 1100° C. or less.

SUMMARY OF THE INVENTION

A monolithic ceramic capacitor is comprised of a barium titanate ceramic preferably comprised of sintered grains of average size within from 0.5 to 0.9 micron, with no more than 4 weight percent material in the grain boundaries including a high melting silicate sintering aid or flux and a lesser amount of a reactivity inhibitor to have controlled grain growth at sintering.

The fine barium titanate grains in this capacitor could only have been achieved by employing at least as fine a start barium titanate powder in the method of this invention. Fine powders have greater surface area per gram and greater surface energy and thus will sinter, without a sintering flux, at a lower temperature. Fine sintered barium titanate grains between 0.5 to 0.9 micron have a relatively smooth and high dielectric constant compared to larger grained barium titanate. And of equal importance, the smaller grained bodies permit closer spacing between adjacent electrodes and provide greater capacitance per unit volume than large grained bodies.

The method according to this invention for making the capacitor comprises mixing with a barium titanate powder having spherical particles of average size ranging from 0.2 to 0.6 micron, from 1.5 to 2.5 weight percent of a cadmium silicate flux and a lesser amount of a reactivity inhibitor, preferably $Nb_2O_5$, with a liquid organic vehicle and binder to form a homogenous slurry or slip. Layers of the slurry are sequentially deposited to form a stack, while adjacent pairs of a plurality of these layers each have interposed a patterned film of a metal electroding ink. The stack is fired at less than 1120° C., to produce a dense ceramic body with buried electrodes, during which sintering the barium titanate particles achieve a high density without substantial grain growth.

The flux is preferably a cadmium silicate that may be $3CdO \cdot SiO_2$, $2CdO \cdot SiO_2$, or $5CdO \cdot 2SiO_2$. The later may be a mixture of equal molar quantities of the first two. Other silicates and mixtures of the silicates may be used provided their characteristic melting temperatures are greater than 1120° C.

This invention recognizes that a cadmium silicate sintering aid combined with a fine barium titanate powder with average particle size less than about 0.6 micron and having a small amount of a reactivity inhibitor will during sintering exhibit an unexpected synergism leading to an X7R type capacitor with superior properties. In particular, cadmium silicates having a characteristic melting temperature greater than the sintering temperature, will take in some of the barium from the titanate to form an eutectic flux that does melt and serve as a medium in which liquid phase sintering can occur. Furthermore, the silicate fluxes being known to be less reactive than borate fluxes nevertheless have the additional advantage that they apparently form into globules in the more spacious interstices of the grain boundaries unlike the borates that readily wet barium titanate, so that substantially higher dielectric constants result than with the borates in very fine barium titanate ceramics.

The method of this invention is further characterized and distinguished by evidencing essentially no shift in the Curie temperarture of the barium titanate during the sintering step. The opportunity for reaction of the barium titanate with the reactivity inhibitor element, e.g. niobium, and with cations in the flux, e.g. cadmium, zinc, bismuth, etc. is thus apparently foregone. Whatever minor reaction of the additives with barium titanate that occurs must be superficial, which is likely due to a limited solubility of this combination of additives in either the flux or the surfaces of the barium titanate particles. Such cations having reacted with the barium titanate during sintering cause a shift in the Curie temperature. In the practice of this invention, there is essentially no change in the operating temperature at which the dielectric constant peaks.

DESCRIPTION OF THE PREFERRED EMBODIMENTS

Figure 2:
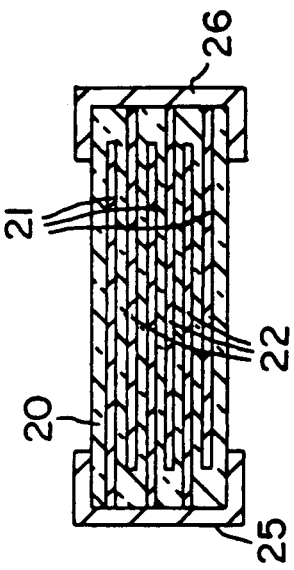
FIG. 2 shows in side sectional view a monolithic or multilayer ceramic capacitor (MLC) of this invention.
Figure 1:
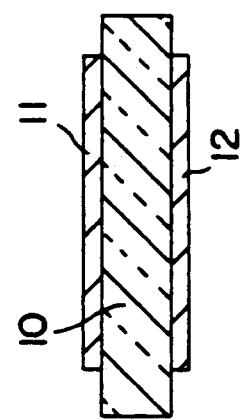
FIG. 1 shows in side sectional view a wafer or disc type ceramic capacitor of this invention.

Twenty related experiments were carried out for producing in each case a test capacitor of the disc type. The procedure employed in each case entails forming a mature barium titanate disc or chip of about 50 mils (1.25 mm) thick and forming electrodes on the two opposite major surfaces of the chip. In particular, a slip suspension was prepared by mixing a powder of essentially pure and highly stoichiometric barium titanate, about 1 weight percent of niobium oxide powder, $Nb_2O_5$, and various quantities of a powdered glass sintering flux in an organic vehicle. The mixing was accomplished by milling with barium titanate balls for 12 hours in a 200 cc polyethylene container.

The resulting slip was cast on a glass plate using a standard doctor blade technique and after drying, the casting was cut into small squares each about $1 \times 1$ cm. The squares were then sintered and after cooling a silver electroding paste was applied to the opposite surfaces of the sintered chip which was subsequently heated to 800° C. to cure the electrodes.

In the first case, Example 1(a) in Tables I and II, the barium titanate used has an average particle size of 1.0 micron (micrometer) and the flux is a cadmium silicate, $5CdO \cdot 2SiO_2$, described in the above-mentioned patent U.S. Pat. No. 4,266,265, wherein it was shown to be uniquely effective as a sintering aid in a barium lead titanate ceramic. This was attributable to its having a melting point higher than the 100° C. sintering temperature unlike other sintering aids that melt at a temperature below the sintering temperature to initiate "liquid phase sintering". This flux only melts and initiates liquid phase sintering after substitution of some barium from the ceramic for some cadmium in the flux that reduces its melting point. This substitution takes place initially by solid state diffusion.

This flux is insufficient at 2 weight percent to effect sintering densification when firing at 1100° C. It can be seen that in Table I, Example 1(b) green chips of the same composition were fired at 1120° C. and still the body will not sinter and densify. In Example 2 the amount of cadmium silicate flux is increased to 3 weight percent and fired successfully at 1100° C. A very high room temperature dielectric constant (K) is obtained although the temperature coefficient of capacitance (TCC) is outside the X7R limits of $\pm 15\%$ over the $-55°$ C. to $\pm 125°$ C. range. But with a 4% addition of cadmium silicate, the K has dropped significantly while the TCC worsened. The drop of K was expected but the substantially less smooth TCC with increasing flux is directly contrary to what the art has taught.

In the next four examples, 4(a) through 6, the same 1 micron barium titanate as in Examples 1(a) through 3 is used, but the flux employed is a cadmium borate. Borate fluxes are known for their greater fluxing efficacy compared with silicate fluxes of the same relative amounts by weight.

Because spherical particles are used the relationship between powder surface area (SA) and powder particle diameter (D) in microns follows quite closely the theoretical $SA(gm/m^2) = 1/D$ for barium titanate, and one micron particle powder has a surface area of one meter squared per gram.

In Examples 1(a) through 6, the barium titanate powder was manufactured by a hydrothermal process and the powder particles are substantially spherical. The one micron average diamater, however, is typically the finest of the conventional barium titanates that have irregular and elongated shapes made by calcining, crushing and extensive comminution, e.g. by milling or jet pulverizing. The spherical particle powders will sinter without flux at a lower temperature than the conventional comminuted-particles powder of the same size. However, all of the examples herein employ the manufactured spherical particles powder and thus the use of such manufactured spherical powder of 1.0 micron average size is considered a more meaningful control against which ceramic bodies made with the preferred finer spherical particles described below.

Referring to Example 4(a) in Tables I and II, the 1.5% ($CdO \cdot 2ZnO \cdot B_2O_3$) flux is not enough to sinter the barium titanate at 1100° C. but as shown in Example 4(b) that composition will sinter at 1120° C. and produces a useful X7R dielectric body with a high K of 2650. For this 1 micron $BaTiO_3$ powder the 3% cadmium silicate provided an equivalent 5.4 milligrams (mg) of the glass former oxide ($SiO_2$) for each meter squared of $BaTiO_3$ powder surface area whereas the 1.5% cadmium borate provided just 4.3 milligrams of the boron oxide for each square meter of $BaTiO_3$ powder surface area. Thus the molar amount of the glass former silicon per square meter of the barium titanate powder surface is $1\frac{1}{4}$ times the molar amount of boron per square meter.

Further increases in the amount of cadmium borate flux has almost no effect on dielectric properties as indicated in the data of Examples 5 and 6.

Referring now to Tables III and IV, similar experiments were run again but using barium titanate powder having an average particle diameter of 0.5 micron. In Example 7, 2% of the cadmium silicate flux results in sintering at 1100° C. and produces an excellent X7R material with a high dielectric constant, whereas in Example 1(a) that amount of cadmium silicate with 1 micron barium titanate could not. Slightly more flux in Example 8 slightly degraded dielectric quality. For this finer (0.5 micron) barium titanate powder, the use of cadmium borate flux is far less effective in Examples 9 and 10 in comparison with the cadmium silicate flux in Examples 7 and 8 with 0.5 micron barium titanate.

The cadmium borate with the finer 0.5 micron barium titanate in Examples 9 and 10 is also less effective than it was in Examples 4(b), 5 and 6 using 1.0 micron barium titanate. But surprisingly, quite the reverse is true of the combination of the fine 0.5 micron barium titanate and cadmium silicate of Examples 7 and 8 compared to cadmium silicate with 1.0 micron barium titanate of Examples 2 and 3.

The density of pure barium titanate is 6.02 gm/cc, and the densities achieved in examples of the tables for which cadmium silicate flux is used is seen to be at least 94% of maximum theoretical density.

In Examples 11 through 14 for which data appears in Tables V and VI cadmium silicate flux is combined with barium titanate powders of different average particle size ranging from 1 micron down to 0.3 micron. All were sintered at 1100° C. and for 1 micron barium titanate 3 weight percent flux was required to effect sintering while the rest used 2 weight percent flux. Only with 0.7 micron and 0.4 micron barium titanate was X7R dielectric material produced. Both the largest $BaTiO_3$ particles powder (Example 11) and the smallest (Example 14) yielded ceramics with less smooth TCC than required by the X7R standard.

It seems remarkable that the fine $BaTiO_3$ of Example 14 sintered at all considering that the glass former oxides ($SiO_2$) in the cadmium silicate flux amounts to only 1 $mg/m^2$ coverage while in Example 11, the cadmium silicate flux is just barely enough to effect sintering at 1100° C. and provides particle-surface-area coverage of 2.5 $mg/m^2$.

Referring to the similar Examples 15 through 18, Tables VII and VIII, two weight percent cadmium borate is employed instead of the cadmium silicate of Examples 12-14. The molar amount per $BaTiO_3$ surface area of the glass former silicon in combination with the fine barium titanate powders in Examples 12-14 is essentially identical to the molar amount of boron per surface area in Examples 16-18 using the same fine powder barium titanate. The cadmium silicate consistently provided a higher dielectric constant than cadmium borate with fine $BaTiO_3$.

The explanation noted above and in U.S. Pat No. 4,266,265 for the unique advantages realized by combining high melting cadmium silicate fluxes with conventional comminuted one micron barium titanate or barium lead titanate, is also appropriate for explaining in part the efficacy disclosed here of cadmium silicate combined with finer barium titanate powder. However, it does not explain why cadmium borate that melts at temperatures well below the sintering temperatures used here, provides excellent results in combination with one micron barium titanate but distinctly less good results than cadmium silicate when combined with barium titanate powders of finer particle size.

This can be partly explained, it is believed, by the fact that the wetability of borate fluxes on barium titanate particle surfaces at sintering is much greater than for cadmium silicate. With fine barium titanate powders wherein the amount of the glass former is little relative to the large surface area of the barium titanate, a skin of borate flux is left covering most of the titanate surfaces reducing the overall dielectric constant of the ceramic; whereas cadmium silicate balls up in the larger pockets of the grain boundaries leaving more direct contact between adjacent particles resulting in a higher dielectric constant.

This later explanation is also conditioned upon the use of a reactivity inhibitor, such as $Nb_2O_5$, $Ta_2O_3$, $Bi_2O_3$, $TiO_2$, and the titanates of Nb, Ta and Bi, because only when such an inhibitor is used will the grains remain small at sintering and the surface area of the barium titanate will remain large. It may also be noted that from curve 30 the Curie temperature is about 125° C., the same as that of the start $BaTiO_3$ powder.

Some experimental monolithic capacitors were made by the following conventional steps. Barium titanate powder of 0.5 micron average particle size, 2 weight percent of $5CdO \cdot 2SiO_2$ flux and 1 weight percent $Nb_2O_5$ were mixed in an organic vehicle and binder medium of turpentine, 6% pine oil and 5% lecithin. This slurry containing about 70% by weight solids was milled for about six hours.

Successive coatings of the milled slurry were applied over a glass substrate, drying each layer in turn and screen printing an electroding paste of 70% silver and 30% palladium to the cast dried layer. Before applying the next successive dielectric layer, the underlying screened pattern of electroding paste was dried. The body 20, as shown in FIG. 2 with buried electrodes 21 and 22, was cut from the stack and was fired to maturity at 1100° C. for $2\frac{1}{2}$ hours. The distance between adjacent buried electrodes in this examples is 0.4 mil (10.2 microns), but other experiments using the same materials and process have yielded excellent X7R monolithic capacitors incorporating down to 0.2 mil (5.1 microns) spacing between adjacent electrodes. A silver paste was then applied to either end of body 20 at which edges of the buried electrodes were exposed. The body was fired at 750° C. for a few minutes to form silver terminations 25 and 26.

Figure 3:
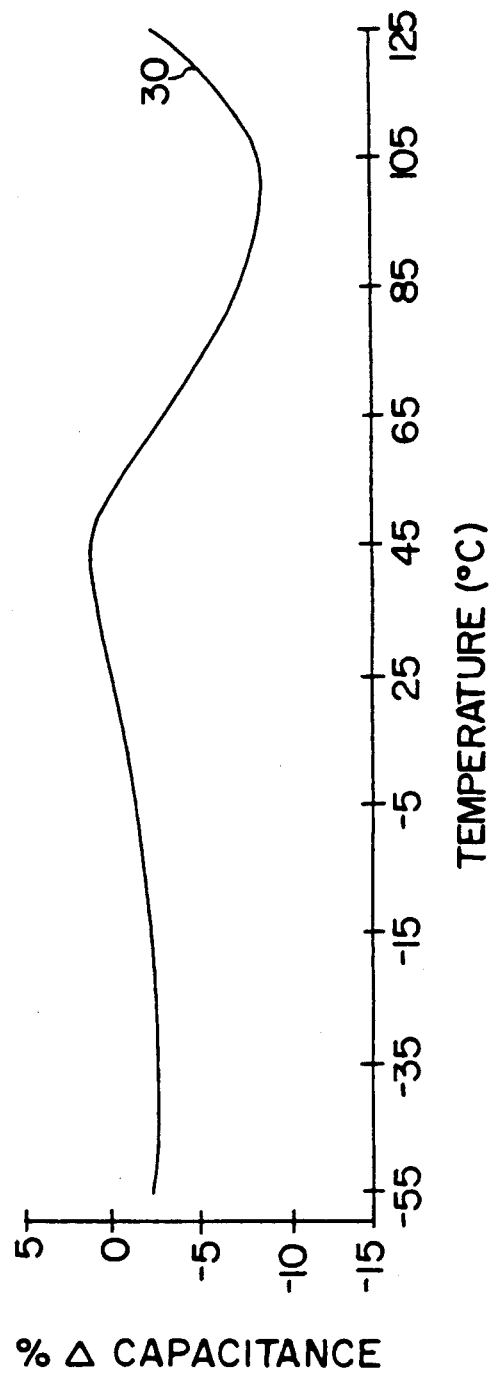
FIG. 3 shows a plot of dielectric constant (K) in curve 30, as a function of capacitor operating temperature for a monlithic ceramic capacitor of this invention.

These capacitors exhibit a dielectric constant K of 3460, a dissipation factor DF of 2.3 and an exceptionally smooth TCC as represented by curve 30 in FIG. 3.

TABLE I

| Example No. | Start BaTiO$_3$ Av. Grain Size (microns) | Flux (wt %) | Reactivity Inhibitor Nb$_2$O$_5$ (wt %) | Sintering Temp. (°C.) | Density (gm/cc) |
|---|---|---|---|---|---|
| 1. | | | | | |
| (a) | 1.0 | (2%) 5CdO.2SiO$_2$ | 1.0 | 1100 | Porous |
| (b) | 1.0 | (2%) 5CdO.2SiO$_2$ | 1.0 | 1120 | Porous |
| 2. | 1.0 | (3%) 5CdO.2SiO$_2$ | 1.0 | 1100 | 5.830 |
| 3. | 1.0 | (4%) 5CdO.2SiO$_2$ | 1.0 | 1100 | 5.877 |
| 4. | | | | | |
| (a) | 1.0 | (1.5%) CdO.2ZnO.B$_2$O$_3$ | 1.0 | 1100 | Porous |
| (b) | 1.0 | (1.5%) CdO.2ZnO.B$_2$O$_3$ | 1.0 | 1120 | 5.807 |
| 5. | 1.0 | (2%) CdO.2ZnO.B$_2$O$_3$ | 1.0 | 1100 | 5.629 |
| 6. | 1.0 | (2.5%) CdO.2ZnO.B$_2$O$_3$ | 1.0 | 1100 | 5.804 |

TABLE II

| Example No. | Dielectric Constant, K @ 25° C. | D.F. (%) | TCC @ −55° C. (% ΔK) | TCC @ +125° C. (% ΔK) |
|---|---|---|---|---|
| 1. | | | | |
| (a) | n.d. | n.d. | n.d. | n.d. |
| (b) | n.d. | n.d. | n.d. | n.d. |
| 2. | 3980 | 1.26 | −22 | +15 |
| 3. | 2330 | 1.65 | −45 | +64 |
| 4. | | | | |
| (a) | n.d. | n.d. | n.d. | n.d. |
| (b) | 2650 | 0.61 | −9 | +7 |
| 5. | 2600 | 0.54 | −9 | +11 |
| 6. | 2560 | 0.57 | −9 | +6 |

TABLE III

| Example No. | Start BaTiO$_3$ Av. Grain Size (microns) | Flux (wt %) | Reactivity Inhibitor Nb$_2$O$_5$ (wt %) | Sintering Temp. (°C.) | Density (gm/cc) |
|---|---|---|---|---|---|
| 7. | 0.5 | (2%) 5CdO.2SiO$_2$ | 1.0 | 1100 | 5.841 |
| 8. | 0.5 | (2.5%) 5CdO.2SiO$_2$ | 1.0 | 1100 | 5.878 |
| 9. | 0.5 | (1.5%) CdO.2ZnO.B$_2$O$_3$ | 1.0 | 1100 | 5.800 |
| 10. | 0.5 | (2%) CdO.2ZnO.B$_2$O$_3$ | 1.0 | 1100 | 5.862 |

TABLE IV

| Example No. | Dielectric Constant, K @ 25° C. | D.F. (%) | TCC @ −55° C. (% ΔK) | TCC @ +125° C. (% ΔK) |
|---|---|---|---|---|
| 7. | 3090 | 0.45 | −10 | +10 |
| 8. | 2970 | 0.50 | −11 | +8 |
| 9. | 2480 | 0.46 | −11 | +6 |
| 10. | 2360 | 0.48 | −10 | +4 |

TABLE V

| Example No. | Start BaTiO$_3$ Av. Grain Size (microns) | Flux 5CdO.SiO$_2$ (wt %) | Reactivity Inhibitor Nb$_2$O$_5$ (wt %) | Sintering Temp. (°C.) | Density (gm/cc) |
|---|---|---|---|---|---|
| 11. | 1.0 | 3.0 | 1.0 | 1100 | 5.830 |
| 12. | 0.7 | 2.0 | 1.0 | 1100 | 5.760 |
| 13. | 0.4 | 2.0 | 1.0 | 1100 | 5.763 |
| 14. | 0.3 | 2.0 | 1.0 | 1100 | 5.760 |

TABLE VI

| Example No. | Dielectric Constant, K @ 25° C. | D.F. (%) | TCC @ −55° C. (% ΔK) | TCC @ +125° C. (% ΔK) |
|---|---|---|---|---|
| 11. | 3980 | 1.26 | −22 | +15 |
| 12. | 2580 | .44 | −7 | +13 |
| 13. | 2690 | .63 | −12 | +10 |
| 14. | 1800 | .47 | −16 | −17 |

TABLE VII

| Example No. | Start BaTiO$_3$ Av. Grain Size (microns) | Flux CdO.2ZnO.B$_2$O$_3$ (wt %) | Reactivity Inhibitor Nb$_2$O$_5$ (wt %) | Sintering Temp. (°C.) | Density (gm/cc) |
|---|---|---|---|---|---|
| 15. | 1.0 | 2.0 | 1.0 | 1100 | 5.583 |
| 16. | 0.7 | 2.0 | 1.0 | 1100 | 5.700 |
| 17. | 0.4 | 2.0 | 1.0 | 1100 | 5.650 |
| 18. | 0.3 | 2.0 | 1.0 | 1100 | 5.673 |

TABLE VIII

| Example No. | Dielectric Constant, K @ 25° C. | D.F. (%) | TCC @ -55° C. (% ΔK) | TCC @ +125° C. (% ΔK) |
|---|---|---|---|---|
| 15. | 2645 | .54 | -7 | +12 |
| 16. | 2190 | .50 | -10 | +8 |
| 17. | 2110 | .62 | -12 | +7 |
| 18. | 1620 | .65 | -19 | +14 |

What is claimed is:

1. A monolithic ceramic capacitor comprised of a barium titanate body, two groups of interdigitated electrodes buried in said body and extending respectively to opposite ends of said body, and two conductive terminations contacting said two groups respectively at said opposing body ends;

said body being comprised of sintered barium titanate grains having an average size of from 0.5 to 0.9 micron, and in the grain boundaries from 1.5 to 2.5 weight percent of a silicate flux and a lesser amount of a reactivity-inhibitor compound.

2. The capacitor of claim 1 wherein said flux is a cadmium silicate.

3. The capacitor of claim 1 wherein said barium titanate grains are approximately spherical.

4. The capacitor of claim 1 wherein said buried co-sintered electrodes are of a palladium silver alloy containing up to 30 weight percent palladium.

5. The capacitor of claim 1 wherein the dielectric constant K of said body at 25° C. is greater than 3000 and varies, from the value at 25° C. over the temperature range of -55° C. to +125° C., no more than 15%.

6. A method for making a high K X7R monolithic ceramic capacitor comprising:

(a) mixing a barium titanate powder having approximately spherical particles of average size from 0.2 to 0.6 micron, from 1.5 to 2.5 weight percent of a cadmium silicate sintering flux, and a lesser amount of a reactivity-inhibitor compound with an organic vehicle and binder to form a homogenous slurry:

(b) preparing layers of said slurry, forming a body of said layers and interleaving patterned films of a metal ink between adjacent pairs of a plurality of said layers: and (c) firing said stack at a temperature less than 1120° C. to produce a dense ceramic capacitor body with buried electrodes and with sintered barium titanate grains having an average particle size of within from 0.5 to 0.9 micron.

7. The method of claim 6 wherein said flux is a cadmium silicate.

8. The method of claim 6 wherein said flux is a silicate selected from $3CdO \cdot SiO_2$, $2CdO \cdot SiO_2$, $5CdO \cdot 2SiO_2$ and mixtures thereof.

9. The method of claim 8 wherein said reactivity inhibitor is $Nb_2O_5$.

10. The method of claim 6 wherein said reactivity-inhibitor is selected from the oxides of niobium, tantalum, bismuth and titanium and from bismuth titanate.

11. The method of claim 6 wherein said barium titanate grains have an average particle size ranging from 0.5 to 0.9 micron.

12. The method of claim 6 wherein at least one of said plurality of ceramic slurry layers has a thickness less than 10 microns.

13. The method of claim 6 wherein said at least one slurry layer has a thickness of about 4 microns.

14. The method of claim 6 wherein the metal in said metal ink includes up to 30 weight percent palladium.

15. The method of claim 6 wherein said barium titanate powder is essentially pure $BaTiO_3$.

* * * * *